United States Patent
Baker et al.

(10) Patent No.: US 9,843,650 B2
(45) Date of Patent: Dec. 12, 2017

(54) INTELLIGENT MODULE SEQUENCING

(75) Inventors: Steve Baker, Arvada, CO (US); Kurt Haserodt, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 910 days.

(21) Appl. No.: 12/553,666

(22) Filed: Sep. 3, 2009

(65) Prior Publication Data

US 2011/0055408 A1    Mar. 3, 2011

(51) Int. Cl.

| | |
|---|---|
| G06F 15/16 | (2006.01) |
| H04L 29/08 | (2006.01) |
| G06F 9/48 | (2006.01) |
| G06F 9/54 | (2006.01) |
| H04L 29/06 | (2006.01) |

(52) U.S. Cl.
CPC .......... *H04L 67/327* (2013.01); *G06F 9/4843* (2013.01); *G06F 9/546* (2013.01); *G06F 2209/482* (2013.01); *H04L 65/1096* (2013.01)

(58) Field of Classification Search
CPC ... H04L 67/327; H04L 65/1096; G06F 9/546; G06F 9/4843; G06F 2209/482
USPC ....................................................... 709/228
See application file for complete search history.

(56) References Cited

U.S. PATENT DOCUMENTS

| | | | |
|---|---|---|---|
| 8,452,956 B1* | 5/2013 | Kersey et al. ............. | 713/153 |
| 8,606,898 B1* | 12/2013 | Phatak ..................... | 709/223 |
| 2003/0046403 A1* | 3/2003 | Schmidt ................... | 709/228 |
| 2003/0187992 A1* | 10/2003 | Steenfeldt et al. ........ | 709/227 |
| 2004/0221005 A1* | 11/2004 | Albaugh et al. .......... | 709/203 |
| 2005/0021670 A1* | 1/2005 | Maes ....................... | 709/217 |
| 2005/0220095 A1* | 10/2005 | Narayanan et al. ....... | 370/389 |
| 2006/0104431 A1 | 5/2006 | Emery et al. | |
| 2006/0187902 A1* | 8/2006 | Birch et al. .............. | 370/352 |
| 2006/0239247 A1* | 10/2006 | Postmus .................. | 370/352 |
| 2007/0088836 A1* | 4/2007 | Tai et al. ................. | 709/227 |
| 2007/0147380 A1* | 6/2007 | Ormazabal et al. ...... | 370/392 |
| 2007/0168421 A1* | 7/2007 | Kalyanpur et al. ....... | 709/204 |
| 2007/0192465 A1* | 8/2007 | Modarressi ............... | 709/223 |
| 2007/0198681 A1* | 8/2007 | Bakke et al. ............. | 709/223 |
| 2007/0201665 A1* | 8/2007 | Kocan et al. ............. | 379/201.02 |

(Continued)

FOREIGN PATENT DOCUMENTS

| | | |
|---|---|---|
| JP | 2006-311123 | 11/2006 |
| WO | WO 03/036495 | 5/2003 |

OTHER PUBLICATIONS

Kulkarni et al., "JSR 289 Expert Group", Oracle Corporation, 2008, 242 pages.

(Continued)

*Primary Examiner* — Philip Chea
*Assistant Examiner* — Wing Ma
(74) *Attorney, Agent, or Firm* — Sheridan Ross P.C.

(57) ABSTRACT

Methods, devices, and systems are provided for selecting and ordering the firing of application modules based on parameters determined during communication initialization including call type, originator of the call, etc. The module invocation sequence is determined based on criteria determined when a connection is received, which then becomes an attribute of that connection such that subsequent messages belonging to that connection have the same module sequencing applied thereto without re-determining the optimal sequence for each message by analyzing the properties of each message every time.

21 Claims, 2 Drawing Sheets

(56) References Cited

U.S. PATENT DOCUMENTS

| | | | |
|---|---|---|---|
| 2008/0056242 A1 | 3/2008 | Hersent | |
| 2008/0101340 A1* | 5/2008 | Bernath | 370/352 |
| 2009/0070790 A1* | 3/2009 | Gilfix et al. | 719/328 |
| 2009/0187919 A1* | 7/2009 | Maes | 719/313 |
| 2009/0235325 A1* | 9/2009 | Dimitrakos | G06F 9/546 726/1 |
| 2010/0064349 A1* | 3/2010 | Randle | H04L 63/10 726/4 |
| 2012/0265886 A1* | 10/2012 | Leeder et al. | 709/227 |

OTHER PUBLICATIONS

Cheung et al., "An application router for SIP servlet application composition," International Conference on Communications, IEEE, May 19, 2008, pp. 1802-1806.

Espinosa et al., "A SIP application router for presence-driven composition of IMS services," The Second International Conference on Next Generation Mobile Applications, Services and Technologies, IEEE, Sep. 16, 2008, pp. 207-212.

Subramanian et al., "Convergence of Java EE and SIP in IMS AS," International Conference on IP Multimedia Subsystem Architecture and Applications, IEEE, Dec. 6, 2007, pp. 1-5.

Extended European Search Report for European Patent Application No. 10175081.8, dated Dec. 14, 2010.

Official Action for China Patent Application No. 201010274723.2, dated Sep. 24, 2013 5 pages.

Official Action with English Translation for Japan Patent Application No. 2010-196531, dated Aug. 9, 2013 3 pages.

Official Action with English Translation for Korea Patent Application No. 2010-0086676, dated Dec. 9, 2013 13 pages.

Official Action with English Translation for Japan Patent Application No. 2010-196531, dated Feb. 28, 2014 3 pages.

Official Action with English Translation for China Patent Application No. 201010274723.2, dated Jun. 17, 2014 11 pages.

Official Action with English Translation for Korea Patent Application No. 2010-0086676, dated Jun. 9, 2014 8 pages.

Notice of Allowance with English Translation for Korea Patent Application No. 2010-0086676, dated Aug. 5, 2014 3 pages.

* cited by examiner

INTELLIGENT MODULE SEQUENCING

FIELD OF THE INVENTION

The invention relates generally to communications and more specifically to SIP applications.

BACKGROUND

Session Initiation Protocol (SIP) is an open signaling protocol for establishing many kinds of real-time communication sessions. Examples of the types of communication sessions that may be established using SIP include voice, video, and/or instant messaging. These communication sessions may be carried out on any type of communication device such as a personal computer, laptop computer, telephone, Personal Digital Assistant, etc. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

The concept of an Application Router has been described with the Java Specification Request (JSR) 289 specification. An Application Router is responsible for application composition. Within this context, application composition is the process of "chaining" multiple applications together into a logical sequence. When multiple applications are chained together, an application will process a given SIP message and once it is done with the needed processing, the application passes the SIP message to the next application in the chain.

Examples of SIP applications which may be included in an application composition include a presence application, a contact resolution application, a call setup application, a blacklist application, a voicemail application, and any other application which provides some sort of feature within the SIP architecture. Each of these applications may comprise two or more modules therein which execute certain functions to provide the overall feature offered by the application.

SUMMARY

Call processing is a time and resource intensive endeavor, especially in systems that employ SIP due to the large number of messages exchanged during call set-up, etc. Often times a SIP application residing on an application server invokes multiple processing modules whenever a SIP message is received. Currently, every SIP application invokes its modules according to a predetermined and fixed sequence. This is somewhat inefficient as some SIP messages do not necessarily need to undergo as much processing as other SIP messages. For instance, internal SIP messages (i.e., SIP messages originating from an internal and, therefore, trusted source) don't necessarily need to have a SIP firewall module applied thereto during call setup, whereas external SIP messages (i.e., SIP messages originating from an external/non-enterprise and, therefore, non-trusted source) do need to have a SIP firewall module applied thereto during call set up. There are currently no solutions that differentiate between SIP messages to determine what modules should be applied thereto.

It is, therefore, one aspect of the present invention to provide a SIP Application that is capable of efficiently and intelligently sequencing its modules based on properties of a SIP message being processed thereby.

It is another aspect of the present invention to provide a message processing approach that is different from prior art approaches in that, at the time a connection is received (or originated outwardly), the far end parameters are examined (and optionally Transportation Layer Security (TLS) credentials supplied in connection therewith). In the case of inbound connections, embodiments of the present invention may optionally take account of the transport and port it used to connect to the enterprise. Using any combination of this information, the connection is classified into a category that binds a particular module sequence to be applied to all communications that are received over this connection.

It is another aspect of the present invention to bind a module sequence to communications received over a channel before seeing the first message. It should be noted, however, that this does not preclude employing solutions which also sequence the messages through an application router module after the proper sequence has been selected. The router module (i.e., the application router which selects determines application chaining) itself may or may not be a component of the module sequence which is bound to a communication based on a channel classification.

In accordance with at least some embodiments of the present invention, the classification criteria used at connect time may or may not be adaptive and dynamic later on. For instance, it may be discovered programmatically that a given server that connects to an enterprise uses legacy SIP strict routing protocol. The connection may be programmatically annotated, thereby modifying the sequence to insert an adaptation module to convert the legacy format to the modern loose routing version of the protocol. All subsequent messages received would sequence the adaptation module. Furthermore, the host's legacy status may be maintained in an internal database so that future connections will automatically establish with the appropriate module sequence that includes the adaptation module.

It is another aspect of the present invention to provide a mechanism that allows a particular application to treat messages, such as SIP messages, differently based on whether that call is originating from an internal source (i.e., an enterprise device) or an external source.

Embodiments of the present invention are adapted to alter the sequence in which modules within an application are applied to a message and/or alter which modules are applied to a message based on the connection characteristics (e.g., caller/callee information). As an example, an application may contain the following modules that are available for application to received messages: (1) SIP framing; (2) Tracer module; (3) SIP firewall; and (4) dispatching proxy. When a connection is received, that application analyzes the connection for certain defining parameters. Based on this determination, the application invokes a rules-based engine that determines which modules should be applied to messages associated with that communication as well as the order in which those modules should be applied thereto. Thus, if the originator is a trusted entity, then the application may determine that application of the SIP firewall module is unnecessary and may also order the remaining modules to maximize the processing efficiency/reduce processing time. A unique attribute of that connection is then permanently associated with that call and affixed to all messages associated with that call. During that communication, subsequent messages having the same unique attribute (therefore belonging to the same communication) have the same module sequencing applied thereto without requiring a re-determination of the module sequence. Hence, an optimal module sequence is determined during communication initialization (before any messages are transmitted) and is stored/associated with the messages in that communication session such that no further determinations are necessary, but the same module sequence is applied to all messages associated with that communication.

It is another aspect of the present invention to increase the overall performance of an application, such as a SIP application, and further reduce the processing overhead associated with processing messages, such as SIP messages.

In accordance with at least some embodiments of the present invention a method is provided that generally comprises:

receiving, at a server, a connection request;
analyzing the connection request to determine parameters of the connection;
determining a preferred module sequencing to be applied to messages of the connection based on the determined parameters of the connection; and
binding the preferred module sequencing to the communication for a predetermined amount of time such that the preferred module sequencing is applied by an application to messages of the communication during the predetermined amount of time.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to intelligently sequence application modules.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
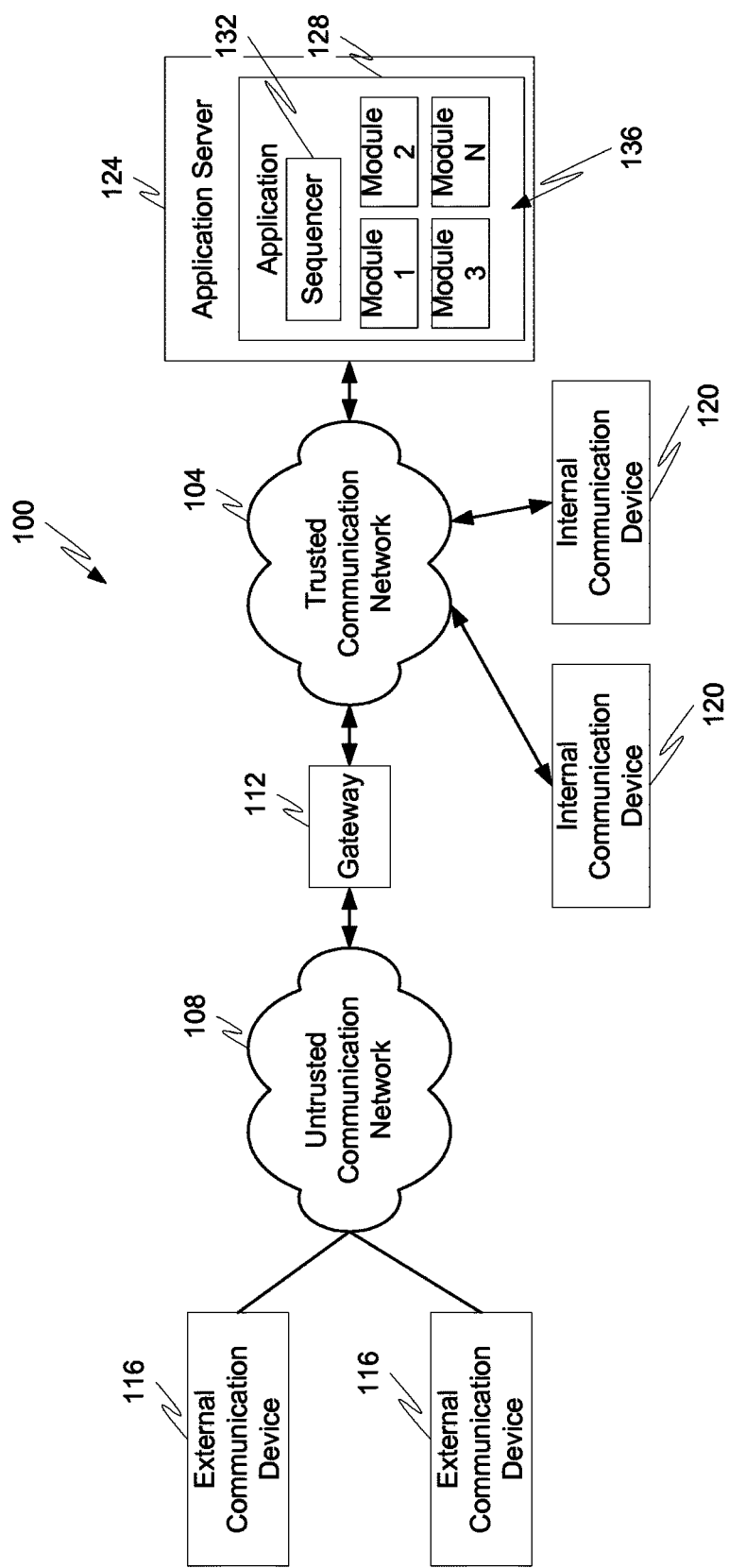
FIG. 1 is a block diagram depicting a communication system in accordance with at least some embodiments of the present invention.

With reference initially to FIG. 1, an exemplary communication system 100 will be described in accordance with at least some embodiments of the present invention. More specifically, the communication system 100 includes a trusted communication network 104 adapted to interconnect one or more communication devices 120 with an application server 124. The communication system 100 may also include an untrusted communication network 108, which is connected to the trusted communication network 104 via a gateway 112 or similar type of network adaptor. The untrusted communication network 108 may also be adapted to interconnect a number of communication devices 116.

In accordance with at least some embodiments of the present invention, the communication devices 120 connected to the trusted communication network 104 may be considered internal communication devices 120 and the communication devices 116 connected to the untrusted communication network 108 may be considered external communication devices 116. As can be appreciated by one skilled in the art, the internal/external nomenclature of communication devices may be adopted and altered depending upon network security concerns. Additionally, it is possible that certain types of communication devices connected to the untrusted communication network 108 may be considered an internal communication device, particularly if a VPN connection or other type of trusted connection is established between the device and the trusted communication network 104. It may also be possible to have communication devices connected to the trusted communication network 104 that are considered external communication devices, particularly if the communication devices are being used by a visiting user of the trusted communication network 104 rather than a registered user.

The trusted communication networks 104, 108 may be any type of known communication medium or collection of communication mediums and may use any type of protocols to transport messages between endpoints. The communication networks 104, 108 may also include wired and/or wireless communication technologies.

The Internet is an example of the untrusted communication network 108 that constitutes and IP network consisting of many computers and other communication devices located all over the world, which are connected through many telephone systems and other means. Other examples of the untrusted communication network 108 include, without limitation, a standard Plain Old Telephone System (POTS), an Integrated Services Digital Network (ISDN), and the Public Switched Telephone Network (PSTN). The trusted communication network 104 may include, for example, a Local Area Network (LAN), a Session Initiation Protocol (SIP) network, any type of enterprise network, and any other type of packet-switched or circuit-switched network known in the art. A Wide Area Network (WAN) is one example of a combination of a trusted communication network 104 operating over or through an untrusted communication network 108. In addition, it can be appreciated that the communication networks 104, 108 need not be limited to any one network type, and instead may be comprised of a number of different networks and/or network types.

The communication devices 116, 120 may be any type of known communication or processing device such as a personal computer, laptop, Personal Digital Assistant (PDA), cellular phone, smart phone, telephone, analog phone, DCP phone, or combinations thereof. A single communication device 116, 120 may be controlled by or be associated with a single user or may be adapted for use by many users (e.g., an enterprise communication device that allows any enterprise user to utilize the communication device upon presentation of a valid user name and password).

Two or more of the communication devices 116 and/or 120 may be associated with the same user. In other words, two communication devices 116 and/or 120 may belong to a single user and may correspond to different types of communication devices. As one example, the user may have four communication devices 116, 120 each of which correspond to a personal phone, a work phone, a personal computer, and an email retrieval device, respectively, of a single user. Alternatively, each of the communication devices 116, 120 may be owned and operated by (e.g., associated with) a different user.

In general, the communication devices 116, 120 may be adapted to support video, audio, text, and/or data communications with other communication devices 116, 120. The type of medium used by the communication devices 116, 120 to communicate with other communication devices 116, 120 may depend upon the communication applications available on the communication device 116, 120.

The gateway 112 may be adapted to translate communication protocols and/or addresses between the communication networks 104, 108. Additionally, the gateway 112 may also be adapted to route messages to/from the external communication devices 116 to the application server 124 for processing by one or more applications 128 in the application server 124.

The application server 124 is adapted to provide applications and functions to the internal communication devices 120 and external communication devices 116. In accordance with at least some embodiments of the present invention, one or more applications stored on the application server 124 may comprise a SIP application for providing features and functions to a SIP call or SIP communication session. Such features and functions may be provided by processing one or more messages which are a part of the communication session.

In accordance with at least some embodiments of the present invention, the application 128 provides a particular function or set of functions. The application 128 may comprise a number of modules 136 to help the application 128 provide such functions and features. More specifically, each of the modules 136 execute an operation on a message received by the application 128 in accordance with the particular function of the application 128. There are many types of applications 128 which may be provided on the application server 124. Examples of the functions that may be provided by the application 128 include, but are not limited to, a voicemail function, a call forwarding function, a call routing function, a coverage function, a recording function, a call setup function, a blacklist function, a whitelist function, an incoming call notification function, an end call function, and a bill customer function. Examples of the types of modules 136 that may be included in the application 128 include, without limitation, a SIP framing module, a tracer module, a SIP firewall module, and an proxy module.

In accordance with at least some embodiments of the present invention, the application 132 may also comprise an intelligent module sequencer 132 adapted to determine a preferred module 136 sequencing to be applied to messages received at the application 128. Although the sequencer 132 is depicted as being included in the application 128, embodiments of the present invention also contemplate a sequencer 132 that can be provided outside the application 132, which may be used to determine a preferred module sequencing for two or more applications 128.

In accordance with at least some embodiments of the present invention the sequencer 132 is adapted to determine a preferred module sequencing (whether and when modules 136 should be invoked to execute an operation on a message) before messages are received at the application 128. More specifically, the sequencer 132 may be adapted to analyze a connection or connection request prior to the establishment of a communication session and determine a preferred module sequencing for that connection based on parameters and characteristics of the connection. As an example, the sequencer 132 may be adapted to analyze whether the communication involves an external communication device 116, a communication type to be used during the connection, an originator of the connection and/or a target of the connection. Based on the results of this analysis, the sequencer 132 is adapted to determine a preferred module sequencing for some or all messages which are transmitted during that connection. In accordance with at least some embodiments of the present invention, the preferred module sequencing may be bound to the connection such that messages subsequently transmitted during that connection have the same preferred module sequencing applied thereto without requiring the sequencer 132 or the application 128 to re-determine the preferred module sequencing by analyzing the properties of each message every time. Instead, the application 128 can determine that a message is a part of a particular connection, determine the module sequencing for that connection, and apply the preferred module sequencing bound thereto.

More specifically, any field in an incoming message can be used and analyzed to determine that the incoming message belongs to a particular connection. In accordance with at least some embodiments of the present invention, a pattern may be associated with a module sequence and if a message is matched to a pattern then that message is sent through the associated sequence of modules. Modules themselves can modify the associations to affect dynamic sequencing. As an example, a certain type of message could always be routed to a firewall module that counts the number of messages received from certain endpoints and if the firewall module finds that it is receiving messages at too fast a rate, the module sequence could by dynamically changed such that all messages may be first passed through a "drop message" module which randomly or according to a predetermined pattern drops a subset of all messages received in an attempt to limit the number of messages sent to the firewall. In some embodiments, a "connection" is simply a pattern consisting of remote and local address and port.

Figure 2:
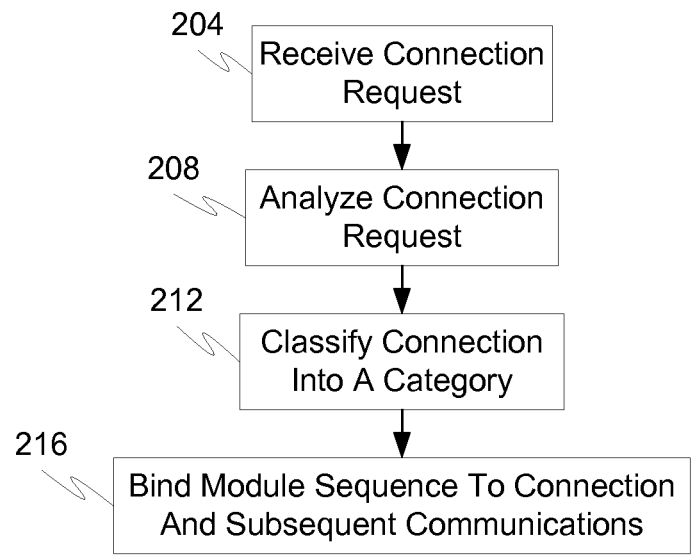
FIG. 2 is a flow diagram depicting a communication classification method in accordance with at least some embodiments of the present invention.

With reference now to FIG. 2, an exemplary method of determining a preferred module sequencing will be described in accordance with at least some embodiments of the present invention. The method begins when a connection request is received at the server 124 and particularly the application 128 (step 204). The connection request may be in the form of a SIP INVITE message, a device alert message, or similar type of connection request message. As used herein a connection request includes any type of message transmitted from one communication device to the server 124 or another communication device in an attempt to establish a communication channel with another communication device. Thus, a connection request is typically non-content-bearing in that it does not have any payload in the body of the message. Instead, a connection request typically only contains information in its headers which are used in connection with establishing the desired communication channel.

The connection request is passed to the sequencer 132 which is responsible for analyzing the connection request and more particularly the parameters and characteristics of the connection request (step 208). The types of parameters which may be analyzed by the sequencer 132 during this step include one or more of the following, but are not limited to, whether the communication involves an external communication device 116, a communication type to be used during the connection, an originator of the connection, and/or a target of the connection.

Based on its analysis of the connection request, the sequencer 132 then classifies the connection into a particular category (step 212). This may include classifying the connection as a trusted connection or an untrusted connection. As can be appreciated by one skilled in the art, a trusted connection may correspond to a connection between internal and trusted communication devices 120. An untrusted connection may correspond to a connection involving one or more external communication devices 116. Other types of classifications that may be made for a connection include media-based classifications (e.g., voice communication, video communication, data communication, voice and data communication, multimedia communication, etc.), security level classifications (e.g., password protected, secured, non-secured, confidential, etc.), and the like.

Based on the classification of the connection the sequencer 132 determines a preferred module sequencing for the connection and binds the preferred module sequencing to the connection (step 216). Binding the preferred module sequencing to the connection also causes subsequent messages which are transmitted over the connection to be processed in accordance with the preferred module sequencing, thereby reducing the amount of processing overhead required with determining and invoking a preferred module sequencing for each message in the connection. Furthermore, the application 128 may be adapted to simultaneously support multiple connections. Each such connection may have a different preferred module sequencing bound thereto and, therefore, messages received at the application 128 may be processed differently based on the connection with which the message is associated. Accordingly, the application 128 may receive a first message and apply a first module sequencing to the first message, then receive a second message and apply a second different module sequencing to the second message if the first and second messages are a part of different connections.

Figure 3:
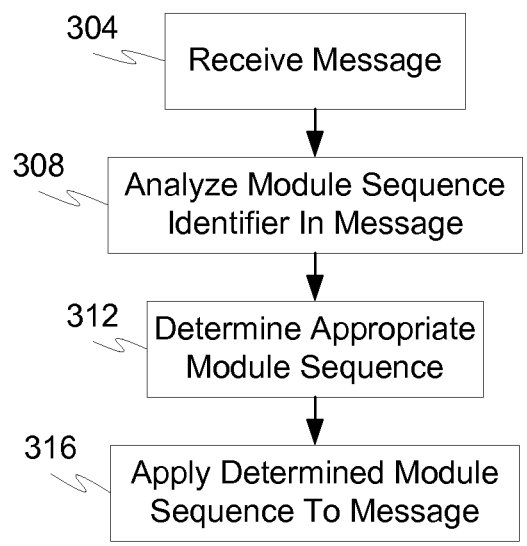
FIG. 3 is a flow diagram depicting a method of processing a SIP message in accordance with at least some embodiments of the present invention.

With reference now to FIG. 3, an exemplary message processing method will be described in accordance with at least some embodiments of the present invention. The method begins when a message is received at the application server 124 and particularly the application 128. The application 128 is operable to analyze a module sequence identifier or other type of marking in the message that indicates the message is associated with a particular connection (step 308). This marking may have been applied to the message by either the communication device which generated and sent the message, the gateway 112 which processed the message upon receiving it from the untrusted network 108, or the application 128 itself when the message was received at the application 128.

It should be noted that the application 128 no longer has to invoke the sequencer 132 on the received message since a preferred module sequencing for the message was determined by analyze the connection request received prior to the message. As can be appreciated by one skilled in the art, however, if no preferred module sequencing has been determined for a connection, then the application 128 may just apply a default module sequencing to messages of that connection. Alternatively, the sequencer 132 may be invoked to analyze the first received message (i.e., content-bearing message) of a connection, determine a preferred module sequencing for that connection, then apply the same preferred module sequencing to subsequent messages of the same connection.

In accordance with at least some embodiments of the present invention, however, the preferred module sequencing was determined based on the analysis of a connection request and the application 128 is adapted to determine the preferred module sequencing for any message received after the connection request if those messages are a part of the connection established by the connection request (step 312). In other words, the application 128 is adapted to determine a preferred module sequencing by analyzing the module sequence identifier of the received message. In accordance with at least some embodiments of the present invention, the module sequence is set up based on criteria known at the time the connection is created (e.g., that coming from a database) as well as criteria that can only be determined after the connection is established (e.g., credential data established during the handshake phase).

Once the preferred module sequencing is determined by the application 128, the method continues with the application applying the determined preferred module sequencing to the message (step 316). More particularly, the application 128 decides which of its modules 138 to invoke and/or the order in which the modules 128 will be invoked. Thus, the application 128 may determine that a first, second, and third module 128 will be used to process the message and the application 128 will further determine the order in which the first, second, and third modules 128 will process the message. Once the message has undergone the appropriate processing by the modules 128 the application may forward the message to another application on the application server 124 or may forward the message to the target communication device. Furthermore, processing of the message may cause another message to be generated by the application 128. This newly generated message may be transmitted to another application or to a communication device 116, 120.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with embodiments of the present invention, systems, apparatuses and methods for sequencing modules for processing messages. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
receiving, at a server, a connection request associated with one of a trusted connection and an untrusted connection;
analyzing, by a processor, the connection request to determine parameters of the connection;
determining, by the processor, a preferred module sequencing to be applied to messages of the connection based on the determined parameters of the connection, wherein the preferred module sequencing is an arrangement of modules within an application, wherein the preferred module sequencing includes a first arrangement of modules for the trusted connection, wherein the preferred module sequencing includes a second arrangement of modules for the untrusted connection, and wherein the first arrangement of modules differs from the second arrangement of modules, and wherein each of the modules execute at least one operation on at least some messages of the connection; and
binding the preferred module sequencing to the communication for a predetermined amount of time such that the preferred module sequencing is applied by an application to messages of the communication during the predetermined amount of time.

2. The method of claim 1, wherein the predetermined amount of time lasts for the entire duration of the communication and wherein the determined parameters of the connection comprise credentials exchanged at the beginning of the connection.

3. The method of claim 2, wherein the preferred module sequencing is applied to all messages of the communication.

4. The method of claim 3, wherein the preferred module sequencing is applied to all messages of the communication without re-determining the preferred module sequencing for each message by analyzing the properties of each message.

5. The method of claim 1, wherein the preferred sequencing is determined based on at least one of (i) whether the communication involves an external communication device, (ii) communication type, (iii) an originator of the communication, and (iv) a target of the communication.

6. The method of claim 1, wherein the modules used to invoke the preferred module sequencing are included in an application which provides a particular function, wherein the modules execute an operation on a message received by the application in accordance with the particular function of the application, and wherein the particular function comprises one or more of a voicemail function, a call forwarding function, a call routing function, a coverage function, a recording function, a call setup function, a blacklist function, a whitelist function, an incoming call notification function, an end call function, and a bill customer function.

7. The method of claim 6, wherein the modules include at least of a SIP framing module, a tracer module, a SIP firewall module, and a proxy module.

8. The method of claim 1, further comprising:
receiving a message at an application;
determining, by the application, that the message is a part of the communication; and
based on determining that the application is part of the communication, invoking the preferred module sequencing on the message.

9. The method of claim 8, wherein the preferred module sequencing is bound to the communication prior to the application receiving the message, and wherein the preferred module sequence is set up based on criteria known at the time the connection is created as well as criteria that can only be determined after the connection is established.

10. The method of claim 8, wherein the preferred module sequencing is dynamically altered by a sequenced module to affect future messages on the connection or to affect messages on a future connection.

11. An application server, comprising:
memory adapted to store instructions that include:
a first application including at least two modules, wherein the first application provides a particular function and each of the at least two modules executes an operation on a first message received by the first application in accordance with the particular function of the first application;
a module sequencer to determine parameters of a communication of which the first message is a part, wherein the communication is associated with one of a trusted connection and an untrusted connection; determine a preferred module sequencing of the at least two modules based on the parameters of the communication, wherein the preferred module sequencing includes a first arrangement of the at least two modules for the trusted connection, wherein the preferred module sequencing includes a second arrangement of the at least two modules for the untrusted connection, and wherein the first arrangement of modules differs from the second arrangement of modules; and bind the preferred module sequencing to the communication such that the preferred module sequencing is applied to the first message; and
a processor operable to execute at least one of the first application and the module sequencer.

12. The server of claim 11, wherein the module sequencer is provided as part of the first application.

13. The server of claim 11, wherein the preferred module sequencing is bound to the communication prior to the first application receiving the first message and wherein the determined parameters of the connection comprise credentials exchanged at the beginning of the connection.

14. The server of claim 11, wherein the preferred sequencing is applied to all messages of the communication.

15. The server of claim 14, wherein the preferred module sequencing is applied to all messages of the communication without re-determining the preferred module sequencing for each message by analyzing the properties of each message.

16. The server of claim 11, wherein the preferred module sequencing is determined based on at least one of (i) whether the communication involves an external communication device, (ii) communication type, (iii) an originator of the communication, and (iv) a target of the communication.

17. The server of claim 11, wherein the particular function comprises one or more of a voicemail function, a call forwarding function, a call routing function, a coverage function, a recording function, a call setup function, a blacklist function, a whitelist function, an incoming call notification function, an end call function, and a bill customer function.

18. The server of claim 17, wherein each of the two or more modules include at least one instance of a SIP framing module, a tracer module, a SIP firewall module, and a proxy module.

19. A non-transitory computer readable information storage medium having stored thereon computer executable instructions that, when executed by a processor, cause the processor to execute a method comprising:
receiving a message at an application, the application including at least two modules, wherein the application provides a particular function and each of the at least two modules executes an operation on messages received by the application in accordance with the particular function of the application;
determining that the message is a part of a communication associated with one of a trusted connection and an untrusted connection, the communication having a preferred module sequencing bound thereto, wherein the preferred module sequencing includes a first arrangement of the at least two modules for the trusted connection, wherein the preferred module sequencing includes a second arrangement of the at least two modules for the untrusted connection, wherein the first arrangement of modules differs from the second arrangement of modules, and wherein the preferred module sequencing defines at least one of (i) an order in which the at least two modules are to execute an operation on the message and (ii) whether one or both of the at least two modules are to execute an operation on the message; and
applying the preferred module sequencing to the message.

20. The computer readable information storage medium of claim 19, wherein the preferred module sequencing is bound to the communication prior to the application receiving the message, and wherein the preferred module sequence is set up based on criteria known at the time the connection is created as well as criteria that can only be determined after the connection is established.

21. The computer readable information storage medium of claim 20, wherein the preferred module sequencing is determined based on at least one of (i) whether the communication involves an external communication device, (ii) communication type, (iii) an originator of the communication, and (iv) a target of the communication.

* * * * *